United States Patent [19]

Arbogast et al.

[11] Patent Number: 4,688,825

[45] Date of Patent: Aug. 25, 1987

[54] SEAT BELT RETRACTOR MECHANISM

[75] Inventors: Thomas P. Arbogast, Troy; Ben J. Charboneau, Wixom; Robert A. Hair, Pontiac, all of Mich.

[73] Assignee: Wickes Manufacturing Company, Southfield, Mich.

[21] Appl. No.: 859,832

[22] Filed: May 5, 1986

[51] Int. Cl.$^4$ ............................................. B60R 21/10
[52] U.S. Cl. ................................... 280/803; 180/268; 180/286; 280/806; 297/477
[58] Field of Search ..................... 280/801, 803, 806; 297/474, 475, 476, 478, 477; 180/268, 286

[56] References Cited

U.S. PATENT DOCUMENTS

| | | | |
|---|---|---|---|
| 3,771,814 | 11/1973 | Hahn | 280/150 |
| 3,866,944 | 2/1975 | Takahashi | 280/150 |
| 3,876,031 | 4/1975 | Stouffer | 297/477 |
| 4,007,802 | 2/1977 | de Rosa | 180/82 |
| 4,040,645 | 8/1977 | Giffen et al. | 280/745 |
| 4,042,277 | 8/1977 | Fisher | 297/477 |
| 4,103,842 | 8/1978 | Martin et al. | 242/107 |
| 4,128,261 | 12/1978 | Paitula | 280/744 |
| 4,181,326 | 1/1980 | Hollowell et al. | 280/806 |
| 4,235,455 | 11/1980 | Collins et al. | 280/803 |
| 4,251,091 | 2/1981 | Weissner et al. | 280/804 |
| 4,471,918 | 9/1984 | Ando | 280/806 |

FOREIGN PATENT DOCUMENTS

| | | | |
|---|---|---|---|
| 2821152 | 11/1979 | Fed. Rep. of Germany | 280/806 |
| 2266524 | 10/1975 | France . | |
| 1583443 | 1/1981 | United Kingdom | 280/806 |

Primary Examiner—John J. Love
Assistant Examiner—Kenneth R. Rice
Attorney, Agent, or Firm—Body, Vickers & Daniels

[57] ABSTRACT

There is provided an improvement in a seat belt retractor mechanism of the type having a seat belt reel rotatably mounted in a support frame adapted to be assembled on a movable door of a vehicle, wherein the reel has at least on one end a generally circular ratchet plate for engaging a locking element movably mounted on the support frame between a first position allowing the reel to payout the belt freely and a second position engaging the ratchet plate to hold the reel against rotation to payout the seat belt. An inertia sensing element carried by the support frame shifts this locking element into the locked position upon being moved by inertia forces caused by rapid acceleration or deceleration of the vehicle to which the mechanism is mounted. In addition, an electromagnet is employed for increasing the amount of inertia force needed to move the inertia sensor element during such rapid changes in speed of the vehicle. This electromagnet is energized when the door is opened so that movement of the door itself by the occupant in entering or leaving the vehicle will not trip the sensor element. The improvement is the provision of a generally flat pole surface for the electromagnet and a generally flat keeper surface which are engaged in a generally coplanar relationship to cause the increased inertia force by magnetic attraction between the engaged surfaces upon energizing the electromagnet when the door is open. When the door is closed, there is no magnetic force between the engaging surfaces so that the inertia sensor element is moved by normal inertia forces.

39 Claims, 14 Drawing Figures

SEAT BELT RETRACTOR MECHANISM

The present invention relates to the art of seat belt retractor mechanisms and more particularly to an improved seat belt retractor mechanism employed in a passive restraint system for a motor vehicle.

BACKGROUND OF THE INVENTION

The present invention is particularly applicable for use in a passive seat belt restraint system for a motor vehicle of the type employing a seat belt retractor located in a door of the vehicle and will be described with particular reference to this type of system; however, it is appreciated that the invention has much broader applications and may be employed in other seat belt retractor environments wherein there is a desire or need to modify the inertia forces necessary for locking the retractor from paying out a seat belt during rapid deceleration or acceleration of the vehicle.

In the automobile industry, there has been a long term development effort in providing passenger protection during times of collision and other emergency situations. At first, seat belts were used across the lap of vehicle occupants in a system requiring the occupant to physically attach the seat belt. This type of system was referred to as "active" in that it required the participation of the vehicle occupant. Many of these systems were developed and employed over a number of years in automobiles and other motor vehicles. These systems often employed a seat belt retractor including a spool on which the excess seat belt would be reeled for snug engagement with the occupants. These reels or seat belt retractor mechanisms ultimately were equipped with inertia sensing mechanisms or elements whereby the retractor mechanism would lock whenever forces exceeding a preselected limit, such as 0.5 g, was experienced by the vehicle. Consequently, a forward collision or rear impact would lock the seat belt retractor mechanism to restrain the occupants during emergency situations. During normal operation, the seat belt could be easily unreeled to the desired comfortable position on passengers of different statures. These inertia locking devices for the seat belt retractor mechanisms generally included either a tripping or swinging weight, the first of which was known as a "standing man" and the other a "pendulum". Inertia would either trip or swing the inertia sensing device and this action would result in the seat belt retractor mechanism being locked. These active seat belt systems were quite successful and could be used in either a lap belt system, a shoulder harness system or a combination thereof; however, they all were active systems requiring the definite intervention of the occupant before protection was obtained.

After substantial development work, one of the more popular retractor mechanisms of the type having an inertia sensing arrangement involved a rotatable spool having a ratchet plate at one end and the inertia sensor element was a pendulum device engageable with a locking bar to drive the locking bar into the ratchet plate upon rapid acceleration or deceleration of the vehicle. To add strength to this arrangement, two separate ratchet plates were located at opposite ends of the spool and were engageable with the same locking bar. This system was mechanically sound and obtained the desired results demanded by the rigor of the environment in which it was to be operated.

The last several years has found an increase in the desire for some type of restraint system for motor vehicles that would be "passive" in nature in that the occupants of a vehicle would be automatically restrained without their manipulative intervention. One passive system which is now being considered for use on motor vehicles is a system wherein the one or two belts are attached on the inboard side of the front seats of a motor vehicle and the seat belt retractors for the belts are located in the vehicle door so that as the door is opened the occupants enter the vehicle behind the seat belt or belts. Upon closing the door, the belts surround the occupants and a retractor mechanism within the door for one or two belts retracts the belt or belts into the operative position. Seat belt retractors in the door of the motor vehicle and equipped with the necessary inertia locking devices have heretofore presented certain technical problems. As someone opens the door of the vehicle, the reel must freely payout so that the door can open; however, should the opening action of the door exceed the sensed inertia force of the retractor mechanisms, the mechanisms would be locked. The door could not be opened further. For that reason, seat belt retractors located in the door of motor vehicles and including inertia sensing mechanisms for locking the mechanisms have been provided with a variety of arrangements for providing normal operation of the inertia sensing elements except when the door was open. At first, it was suggested to use mechanical lockouts or solenoid operated lever systems wherein, as the door is opened, the inertia device becomes inactive. This did solve the problem of opening the door, unless there was mechanical failure. However, some accidents occur with the door open, which would discourage use of such mechanical lockouts. To overcome the complex problems resulting from placing inertia locked seat belt retractors in vehicle doors, it has been suggested that various arrangements could be employed for increasing slightly the inertia force necessary for activating the locking arrangement of the retractor mechanism when the door is opened. This increase was to a degree that the mechanism would be responsive to collisions and other abrupt changes in the vehicle speed even when the door was opened. In other words, it was suggested that the movement of the inertia sensor element could be restrained slightly when the door is opened, but not completely locked from operation as suggested in the past. Several arrangements for increasing the force of the inertia sensor in a door mounted retractor mechanism are disclosed in Hollowell U.S. Pat. No. 4,181,326, which is incorporated by reference herein as background information. In accordance with this particular patent, an electromagnet can be employed for increasing the force of the swinging pendulum. Further, a permanent magnet can be employed on the standard pivoted locking bar for applying a certain amount of increased resistance to pivoting the bar into the locking position when the door is opened. Sensing of the door opened condition can be accomplished by a standard doorjamb switch that is closed when the door is opened. The most successful approach shown in the Hollowell patent is the concept of employing an electromagnet coacting with the pendulum to increase the inertia force necessary to move the pendulum when the door is in the opened position. The same concept is illustrated in de Rosa U.S. Pat. No. 4,007,802 on a spool having a single ratchet plate on one end.

A further arrangement for employing a permanent magnet to increase the inertia force necessary to trip a door mounted retractor mechanism of the type contemplated by the present invention is illustrated in Collins U.S. Pat. No. 4,235,455. The de Rosa and Collins patents are also incorporated by reference herein for the purposes of background information. As can be seen from the prior art structures illustrated in these patents, it is known to employ a permanent magnet operating on the bottom of a pendulum or a permanent magnet operating on a portion of the pivoted lock bar both for the purpose of increasing slightly the inertia force necessary for tripping the lock bar when the door is opened as indicated by the position of a doorjamb switch.

Seat belt retractor mechanisms as illustrated in the prior art and described above had substantial disadvantages. When mechanical overriding arrangements were employed, the moving parts could wear out and could conceivably hold the locking bar in the inactive position. When solenoids were used to operate linkage systems directly, a movable core member was employed. This core member could lock in various positions, especially when subjected to adverse environmental conditions. Moving parts would present difficulties as would various assembly tolerance accumulations. Also, solenoids would require substantial currents and would present electrical drains on the battery if locked into certain positions. Such solenoids are shown in the Hollowell patent. To overcome the disadvantages of this solenoid arrangement, the electromagnet concept with a fixed core has been suggested as in all three patents incorporated by reference herein. By utilizing an electromagnet concept, disadvantages of the solenoid have been overcome; however, electromagnets, as suggested by the prior art patents described above, have certain disadvantages the most prevalent of which was the susceptibility of the magnetic force to manufacturing tolerances. Since the magnetic force in a magnetic circuit is highly dependent upon mechanical tolerances and electrical parameters, such permanent magnets are susceptible to complex geometrical and electrical variations generally unacceptable from a cost standpoint and operational predictability needed for wide spread use in mass production of motor vehicles.

THE INVENTION

The present invention relates to an improved seat belt retractor of the type generally disclosed in the prior art mentioned above, which retractor overcomes the disadvantages of prior attempts to employ a low cost, dependable, easily assembled seat belt retractor with a force modifying feature for use in the door of a motor vehicle.

The primary object of the present invention is the improvement of a seat belt retractor of the type having an inertia locking arrangement, which improved retractor has a dependable, easily assembled, non-mechanical arrangement for increasing the inertia force needed to lock the tretractor when the door of a vehicle using the retractor is opened.

Yet another object of the present invention is the provision of an improved seat belt retractor, as defined above, which seat belt retractor is electrical in operation and overcomes the disadvantages of other electrical arrangements, such as solenoids and prior electromagnetic systems.

Still a further object of the present invention is the provision of an improved seat belt retractor, of the type defined above, which seat belt retractor uses an electromagnet having a controlled additional force exerted against the inertia locking device without adverse fluctuations thereof mechanical tolerances and/or electrical variations.

Yet another object of the present invention is the provision of an improved seat belt retractor, as defined above, which seat belt retractor employs an electromagnet having a preselected controlled gauss magnetic force exerted upon the mechanism used to move the locking bar or similar arrangement in the seat belt retractor.

Yet another object of the present invention is the provision of a seat belt retractor, as defined above, which seat belt retractor employs a unique arrangement for controlling the output of an electromagnet used to control the additional force applied to the sensor element during times when the door of the vehicle is opened.

These objects are accomplished by the present invention which is a device for locking the payout of a seat belt from a seat belt retractor mechanism in response to a sudden acceleration or deceleration of a vehicle on which the device is mounted, wherein the device comprises an electromagnet with an operating coil and a core with a flat coil piece, an element with a flat keeper surface formed from magnetically permeable material, an inertia sensing member moved by external forces exerted on the vehicle, means for allowing relative movement between the pole piece and keeper element from a first position with the pole piece and keeper surface engaging each other in a coplanar relationship into a second position with the keeper surface pulled away from the engaging, coplanar relationship when the inertia sensing member is moved, means for locking the retractor when the pole piece and element are in the second position and means for selectively causing the electromagnet to exert an attraction force between the pole piece and the surface. The keeper can be at the bottom of the pedestal in a standing man arrangment or a surface of the standard locking bar shown in the prior Hollowell and Collins patents. By utilizing the coplanar, engaging relationship between the keeper surface and the pole surface, mechanical tolerances are eliminated from the magnetic circuit used to increase the inertia force necessary for locking the retractor when the door of the vehicle is opened.

In accordance with another aspect of the present invention, the electromagnet, as all electromagnets, has a magnetic saturation strength created by an energizing current exceeding a given value and the power circuit for energizing the electromagnet in the retractor utilizes a current source from the vehicle having a value substantially exceeding this given value so that the magnetic core of the electromagnet is operated in the saturation range to avoic variations caused by normal variations in the electrical system of the vehicle in which the retractor is employed. By utilizing the saturated core, the increased force can be controlled easily by the dimensions of the core piece which can be done quite accurately without expensive manufacturing operations or assembly techniques. Consequently, the controlled magnetic force together with a controlled coplanar engaging surface area fixed with respect to either the lock bar or inertia element can control, within precise limits the additional force exerted when the electromagnet is energized by opening the door.

By employing the present invention, the effects of manufacturing tolerances and electrical parameters are minimized in the operation of the arrangement for increasing the force on the inertia element and/or sensor when the door of the vehicle is opened. This decreases the assembly cost, decreases the complex geometry employed in the total design and assures repeatable operating conditions from one vehicle to the next. Should the electromagnet not operate, there is no moving element; therefore, the retractor will operate normally. This is a substantial advantage over lever systems and solenoids heretofore employed in this type of device. Further, the reduction of mechanical and electrical variations in the electromagnet arrangement overcomes the disadvantages of prior suggestions of using this concept and makes the electromagnet a viable concept for use in seat belt retractors of the type mounted in the door for passive seat belt systems. Of course, the same arrangement could be used in an active system although it is not specifically developed for that purpose.

Further objects and advantages of the present invention will become apparent when reviewing the specification including the drawings described in the following section.

PREFERRED EMBODIMENT

Figure 1:
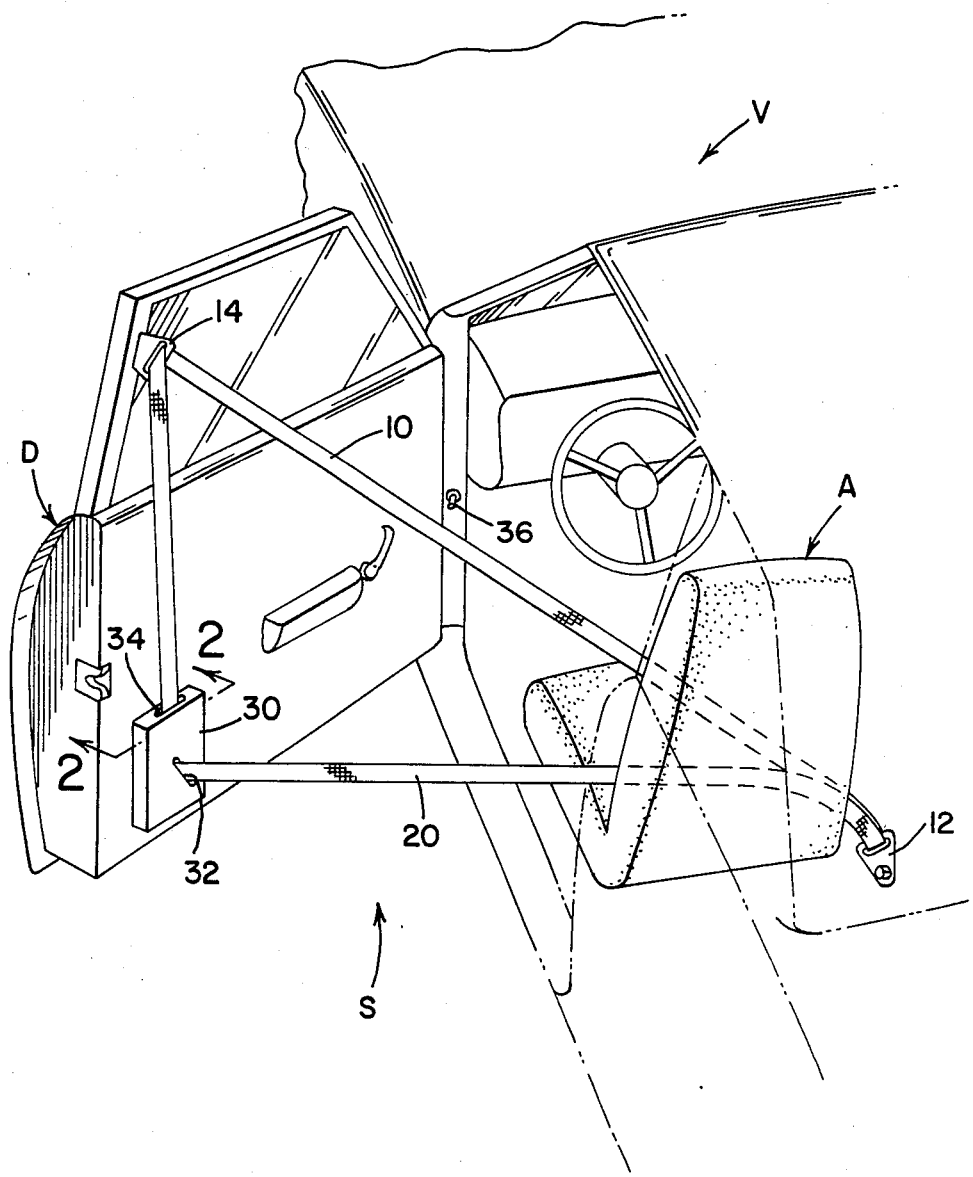
FIG. 1 is a partial pictorial view of a motor vehicle provided with a passive seat belt restraining mechanism employing two separate seat belt retractors constructed in accordance with the present invention.

Referring to the drawings wherein the showings are for the purpose of illustrating the preferred embodiment of the invention only and not for the purpose of limiting same, FIG. 1 shows a motor vehicle V having a seat A for an occupant, driver in this instance, and two doors, only one of which is shown as door D. Vehicle V is provided with a somewhat standard passive restraint system S, having an upper shoulder harness or belt 10 secured between the occupants of the vehicle at anchor 12 and with a bight defined by guide 14 secured onto the vehicle door D. A lap belt 20 extends from anchor 12 and is received by a retractor within housing 30 by way of opening 32. Second retractor in housing 30 receives the outboard end of belt 10 as it extends through opening 34 of the housing. As so far described, passive restraint system S is somewhat standard. As door D is moved to the opened position as shown in FIG. 1, belts 10, 20 extend between the door and passenger seat A. As a person enters the vehicle, belt 10 extends over the torso while belt 20 is wrapped over the lap of the occupant. As door D is shut, retractors within housing 30 take up the slack in belts 10, 20 so they remain in a snug position around the person in the seat A. Of course, a similar system S would be used on the occupant side of vehicle 1. In some instances, only a single belt 10 or 20 may be used in a passive system. In that instance, another belt may be made available as an active restraint system. Irrespective of the various modifications of system S, the retractor for each belt in housing 30 includes an arrangement for locking the belt from unwinding and lengthening whenever a certain inertia force is exerted on vehicle V by a collision with another vehicle or a collision of the vehicle with another obstacle. Such inertia locked seat belt retractors are well-known in the automotive art. These devices or mechanisms, when mounted on a door, such as door D, present difficulty in that belts 10, 20 must unreel easily to allow door D movement from the closed to the opened position. To accomplish this easy operation, it has been suggested that the door mounted mechanisms have some type of an arrangement to prevent actuation by this normal movement of the door. Such mechanisms usually employ the standard doorjamb switch 36 for activating an override arrangement to prevent locking of the retractors within housing 30 when door D is moved from the closed position. By these mechanisms, many of which are known, door D may be moved conveniently from the closed to the opened position without obstruction caused by inadvertent locking of retractor mechanisms within the housing 30. In like manner, as the door is shut, the retractors within the housing 30 operate to take up the slack so that belts 10, 20 do not accumulate within the passenger housing of vehicle V during the door shutting operation. The various arrangements for allowing normal operation of door D have been discussed above. The practical arrangement for accomplishing this purpose is a mechanism allowing the door to be moved normally, but not disabling the retractor locking arrangement upon closing of switch 36. In other words, as the switch is closed by opening the door, the inertia force necessary to lock the retractor mechanisms in housing 30 is increased slightly, but the inertia device is not disabled.

Figure 2:
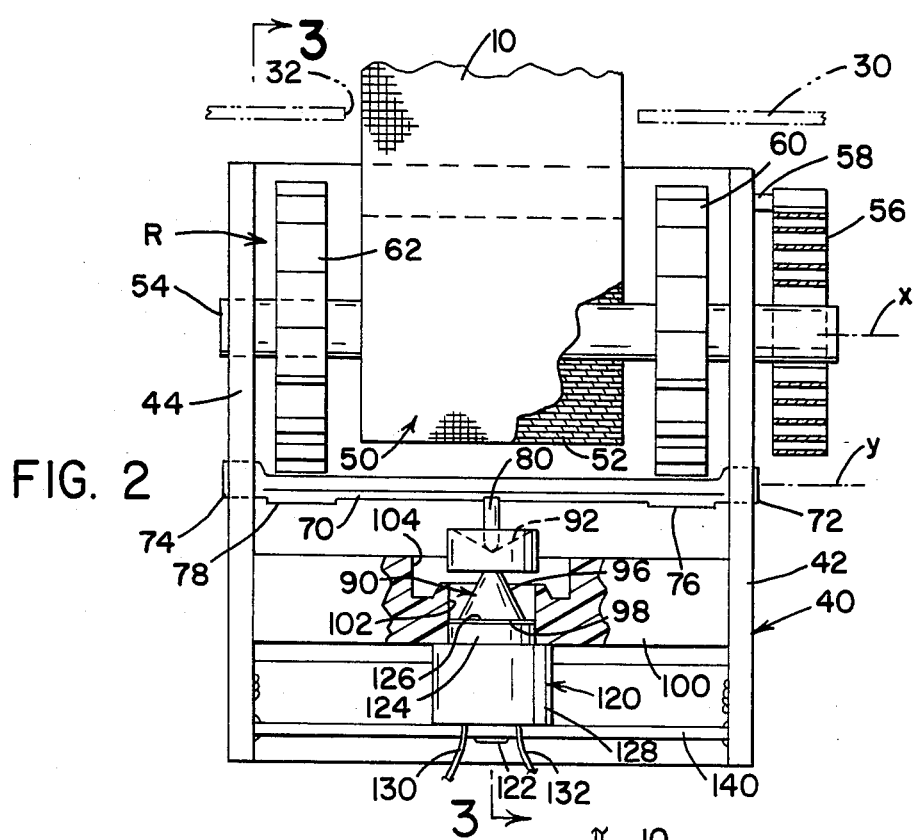
FIG. 2 is an enlarged, partially cross-sectional view taken generally along the line 2—2 of FIG. 1.
Figure 3:
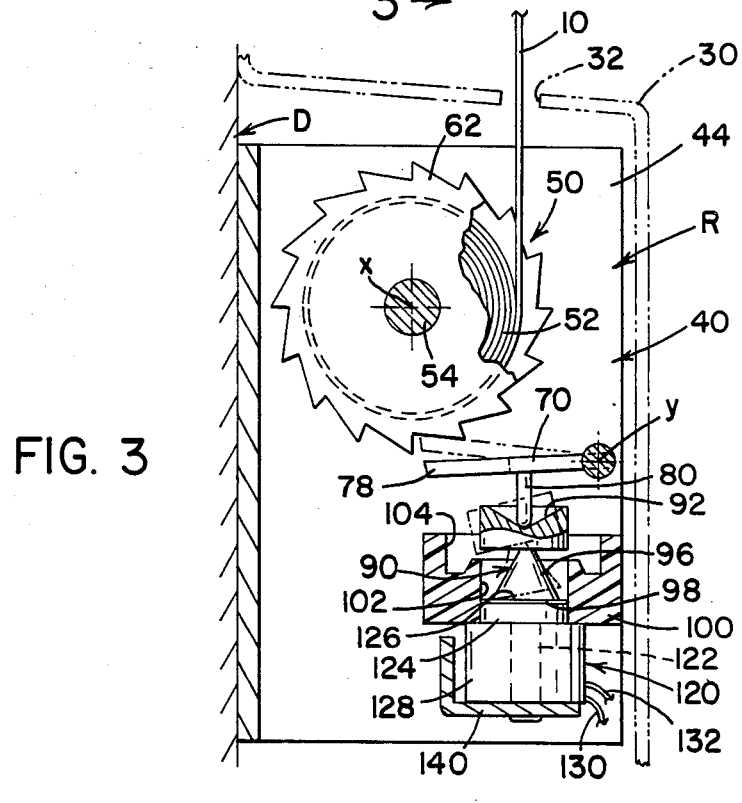
FIG. 3 is a cross-sectional view taken generally along line 3—3 of FIG. 2.

In accordance with the present invention, two separate retractor mechanisms are used in housing 30 shown in FIG. 1. The first of these retractors is used for shoulder belt 10 and is best illustrated in FIGS. 2 and 3 and schematically illustrated in FIG. 7. The shoulder belt retractor mechanism R is mounted on a metal support frame 40 stamped from sheet metal and having outwardly extending, generally parallel walls 42, 44. Of course, the mounting frame could be manufactured from plastic and details of this frame are not a part of the present invention except to the extent discussed and claimed. In accordance with standard practice, retractor mechanism R includes a reel 50 for convolutions 52 of belt 10. Reel 50 is rotatably mounted by shaft 54 to rotate about axis x on support frame 40. A standard torsion spring 56 extends between shaft 54 and a tab 58 fixed to wall 42 of housing 40. Torsion spring 56 biases shaft 54 in a rotational direction reeling tape 10 into convolutions 52 to maintain a preselected tension on belt 10 during normal operation. Spool or reel 50 includes axially spaced circular ratchet wheels 60, 62 having matching teeth orientations and adapted to be engaged by pivoted locking member or plate 70 oscillating between an unlocked and locked position in holes or apertures in walls 42, 44. Formed metal ends 72, 74 allow locking member, plate or bar 70 to pivot about axis y. In practice, plate or bar 70 is formed from a ferrous sheet metal and ends 72, 74 are twisted to produce loose engagement with a butterfly shaped aperture, such as aperture 75 in FIG. 11. In this manner, metal locking bar 70 is usually oscillated between an upper position engaging ratchet wheels 60, 62, as shown in the phantom line of FIG. 3, and a lower normal position shown in solid lines in FIG. 3. The pivotal axis y is generally parallel to the axis x and allows free oscillating motion of bar 70. As so far described, spring 56 maintains tension on belt 10. As door D is opened, belt 10 unreels to the position shown in FIG. 1. When the door is closed, spring 56 maintains tension on belt 10 so that the belt is taken up as the door is moved into the closed position.

Figure 7:
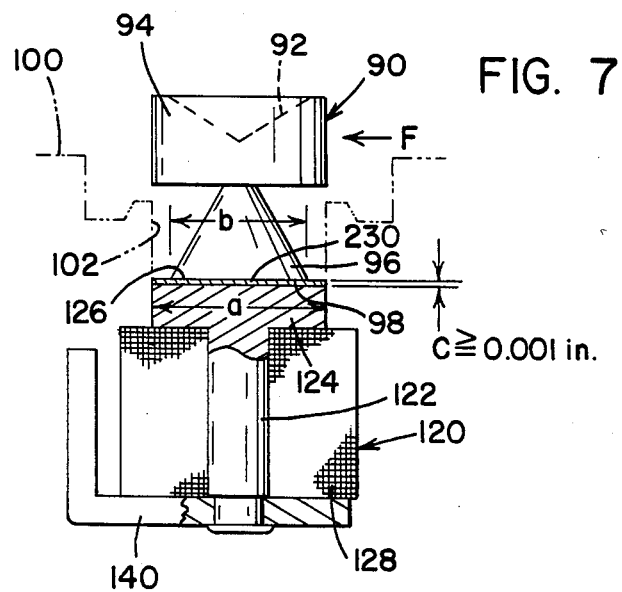
FIG. 7 is a schematic view of the standing man arrangement utilized in the seat belt retractor shown in FIG. 2 in graphic form.

To protect the person riding in seat A, reel R must lock when vehicle V is subjected to forces indicative of an emergency situation. This force may be as low as 0.5 g. In this preferred embodiment, fingers 76, 78 on bar 70 are pushed or swung upwardly into engagement with the teeth of ratchet wheels 60, 62 by plunger 80 when vehicle V is subjected to a rapid deceleration or acceleration. Movement of plunger 80 is caused by the tiltable inertia sensor element or "standing man" 90 which is best shown in FIG. 7. This standing man is somewhat shaped as illustrated and includes an upper conical recess 92 for receiving plunger 80, a vertically elevated head 94 to move the center of gravity of the standing man vertically upward from lower pedestal 96. Pedestal 96 is frustum in shape and has a relatively small pointed area at the top which intersects the head of pedestal 96 and a lower flat circular surface 98. The standing man is formed from a high permeability mangnetic material and is constructed so that the standing man will tip when a force F is applied in any direction to the center of gravity of the standing man. This tipping action is controlled, in accordance with standard practice, by an appropriate mounting plate 100 having an upstanding circular recess 102 and upper clearance opening 104 for allowing the standing man to tilt when a force F exceeding a certain preselected value is exerted transversely against the standing man. When there is no force, the standing man uprights itself. As shown in FIG. 3, tilting of the inertia sensing member or element 90 causes plunger 80 to move fingers 76, 78 into ratchet plates 60, 62 respectively. This locks reel 50 from any further payout and restrains the occupant of seat A during emergency conditions as sensed by the tipping action of element or standing man 90. As so far described, movement of the door could activate the standing man and lock reel 50. This would prevent normal operation of door D.

Figure 9:
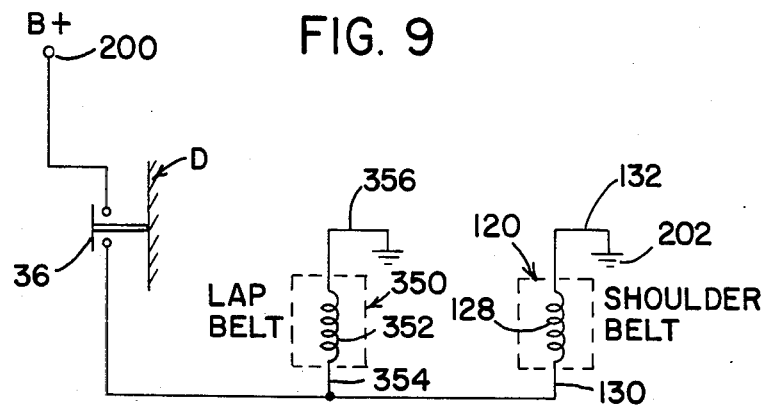
FIG. 9 is an electrical wiring diagram illustrating the doorjamb switch for operating the two seat belt retractors contemplated in the illustrated embodiment of the present invention.

In accordance with the invention, the standing man is positioned directly on electromagnet 120. This electromagnet includes a fixed core 122; therefor, it is not a solenoid. Core 122 includes an outwardly facing pole piece 124 with an upper flat surface 126 having a diameter a as shown in FIG. 7. This diameter is greater than the diameter b of high permeability surface 98. Thus, the diameter of surface 98, which may be accurately controlled, determines the tilting action and force applied by magnet 120 to resist the tipping action or tilting action of the standing man. Electromagnet 120 is energized, in accordance with normal practice, by coil 128 having leads 130, 132. As a voltage is applied across these leads, current flows through coil 128 to energize electromagnet 120 for causing a magnetic force through the high permeability magnetic core 122 and at the upper pole face or surface 126. Magnet 120 is firmly fixed within opening 102 of plate 100 to create coplanar engaging relationship between the under surface of the standing man and the upper pole surface 126 of electromagnet 120. Bracket 140 supports magnet 120 and is secured across support frame 40 in accordance with standard assembly practice, which does not form a part of the present invention. As can be seen, there is always coplanar engagement with the under surface of the standing man and the upper pole surface 126. This provides consistency in the amount of force exerted against the standing man upon energizing the magnet 120 which occurs when switch 26 is closed by opening door D, as schematically illustrated in FIG. 9. The dimensions relationships used in practice for the standing man are shown in the actual commercial embodiment of retractor mechanism R, shown in FIG. 11.

Figure 8:
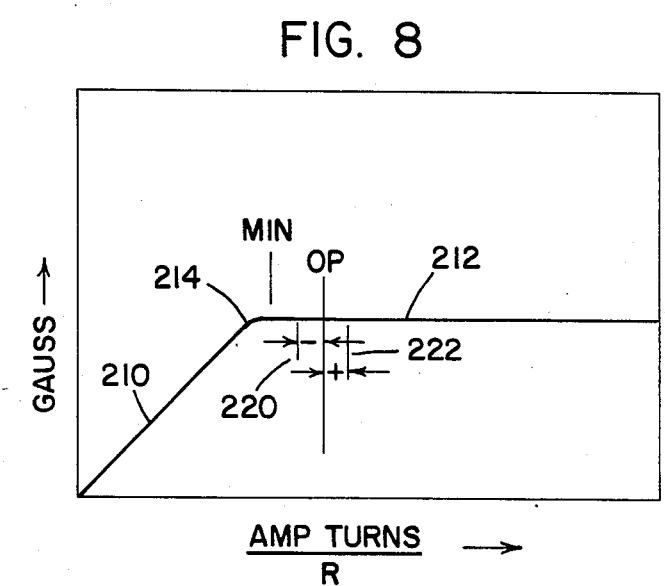
FIG. 8 is a magnetic force output graph showing the saturation operation of the electromagnet in accordance with an aspect of the invention.
Figure 10:
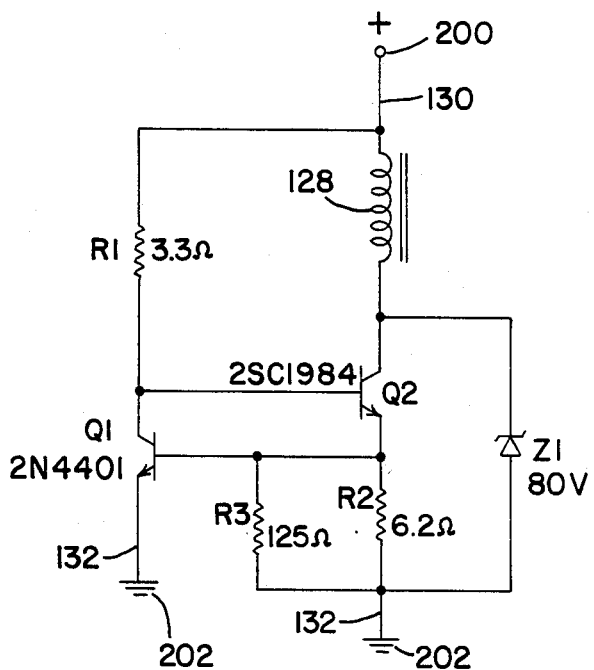
FIG. 10 is an electrical wiring diagram showing one arrangement for obtaining a constant current for use in the electrical circuit illustrated in FIG. 9; and, FIG. 11 is a more detailed view of a system contemplated for using the preferred embodiment of the present invention.

Referring now to FIG. 8, 9, and 10, electrical characteristics and structures for the preferred embodiment of the invention are illustrated. The normal operating battery of vehicle V includes a positive terminal 200 and a negative terminal 202 connected across coil 128 by closing doorjamb switch 36. When this occurs, current flows through coil 128, in accordance with the voltage across terminals 200, 202. This current flow, together with a number of turns in coil 128, determines the magnetic force applied against standing man 90 to impart a controlled resistance to tilting of the standing man when door D is not shut. The operating curve for magnet 120 is illustrated in FIG. 8. As the current changes, the ampere-turns changes accordingly. The reluctance R of the magnetic circuit for magnet 120 remains constant; therefor, at first, increased current causes a proportional increase in the output magnetic force exerted by pole piece 124 to attract standing man 90. As the current continues to increase, ultimately the further current increases do not change the output force in gauss. This occurs at the standard knee 214 which exists for any electromagnet having a ferrous core. What happens, is that the core of the magnet saturates at knee 214. Further increases in current cannot create more lines of force; therefor, the lines of force, or gauss, remains the same as the current increases along line 212. This characteristic is employed in one substantial aspect of the present invention. Coil 128, in accordance with this aspect of the invention, is operated beyond knee 214. The operating point OP built into the coil changes between a minimum value 220, substantially beyond knee 214, and a maximum value 222. Thus, as the voltage between terminals 200, 202 of the vehicle batter varies substantiallly by weather, battery condition and other factors, the current flow through coil 128 maintains at least the ampere-turn relationship about the minimum point 220. Core 122 is operated in the saturated range. Consequently, a fixed magnetic force attracts standing man 90 against pole surface 126 whenever switch 36 is closed. The saturation point can be exceeded by selecting the diameter and material of core 122 within coil 128. In accordance with a modification of the invention, the circuit illustrated in FIG. 10 can be used to establish a constant current through coil 128. This concept could be used to operate the electromagnet along sloped portion 210 of FIG. 8; however, it may be employed in accordance with the aspect of the invention relating to the operation of the core in the saturated condition. As illustrated in FIG. 8, operation of electromagnet 120 in the operating range between points 220, 222 is also dependant upon the reluctance R of the magnetic circuit. This reluctance is primarily controlled by the air gap between surfaces 98 and 126. In accordance with the invention, these surfaces engage each other and are coplanar which is allowed by a flat surface of the standing man resting upon the upper flat surface of the pole piece. By using the present invention with the coplanar relationship of the keeper surface of the bottom of standing man 90 and the magnetic pole piece surface, the reluctance of the magnetic path is substantially fixed without regard to manufacturing tolerances which is not the case in other arrangements employing electromagnets. By obtaining a fixed reluctance in the operating air gap, it is possible to use a permanent magnet for the purpose of increasing slightly the force necessary to lock reel 50 as door D is in the opened position. Use of the present invention accomplishes this objective. FIG. 7 shows a plated surface 230 having a thickness c which is less than 0.001 inches. This plating surface which is often drastically below the indicated level does not change the fact that the two surfaces are coplanar in engaging each other. This plating material is non-magnetic and does not drastically change the reluctance even if it should be worn off. By using a low permeability plating metal, surface 230 can reduce any residual magnetism which may occur when a magnet 120 is deactivated. Such residual magnetism does not appreciably affect the normal operation of standing man 90 during operation of vehicle V.

Figure 11:
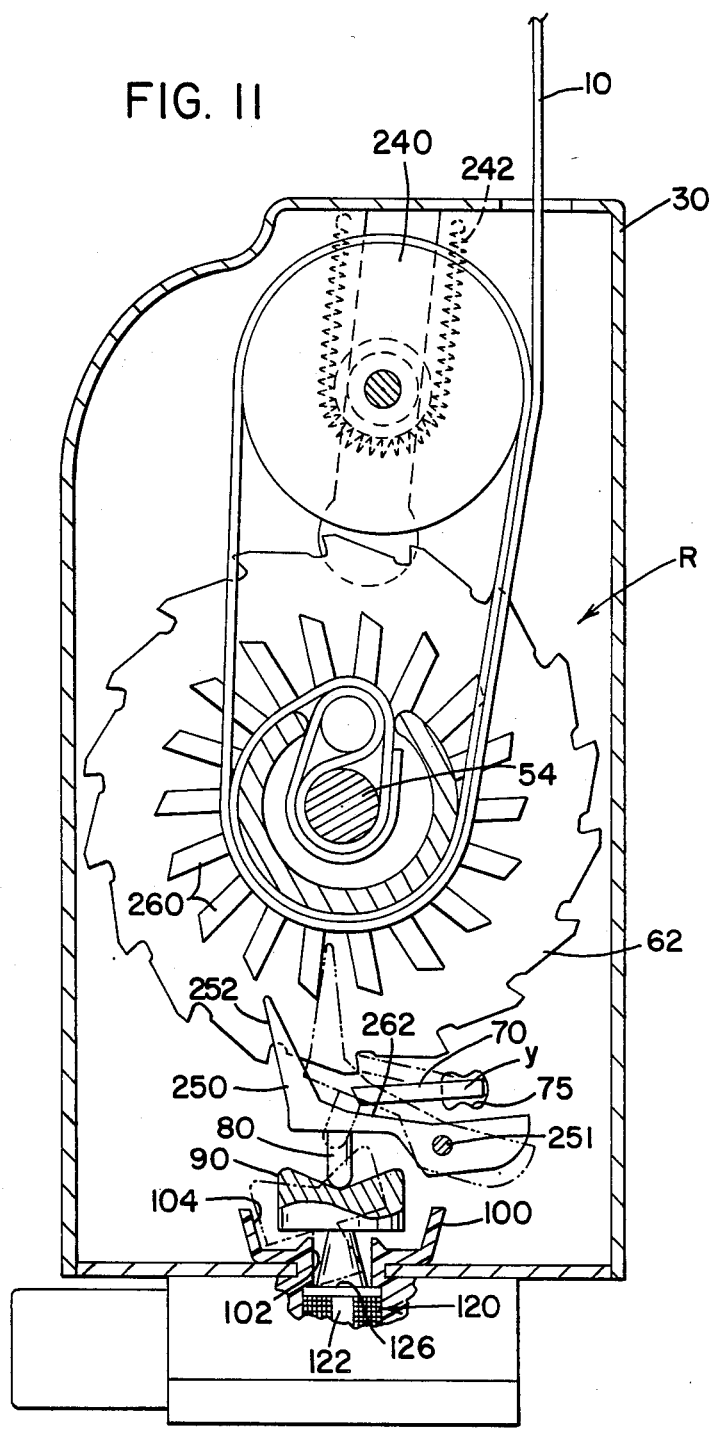

FIG. 11 illustrates the commercial embodiment of retractor mechanism R and is self-explanatory. The belt reel includes a takeup pulley 240 biased away from shaft 54 by spring 242. This maintains a certain amount of control over the tension of belt 10. The basic change is the use of an intermediate bracket 250 pivoted about shaft 251 and including upstanding fingers 252 adapted to engage aligning wings 260 as the standing man is tipped. Finger 250 engages wings 260 to rotate ratchet plate 62 to a position allowing locking bar 70 to move into the locking position, as shown in phantom lines in FIG. 11. Otherwise, this commercial embodiment employs the same features and operates in accordance with the previously described concepts. When the door is opened, magnet 120 is energized to attract standing man 90. This exerts a force holding the standing man in its vertical position. This increases slightly the inertia force necessary to tilt the standing man into the operating or emergency position locking retractor mechanism R. Thus, when the door is opened, a greater force is required to cause tipping of the standing man but this force is not so great to prevent normal operation of the standing man during collision conditions with magnetic 120 energized.

Figure 4:
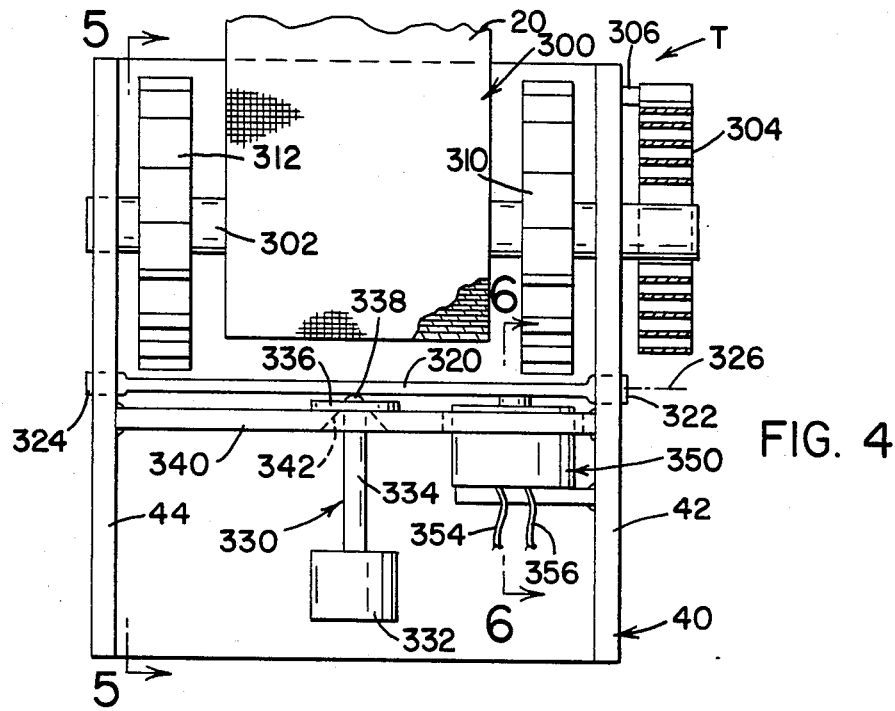
FIG. 4 is a view similar to FIG. 2 illustrating the retractor employed for the lap belt of the system shown in FIG. 1.
Figure 5:
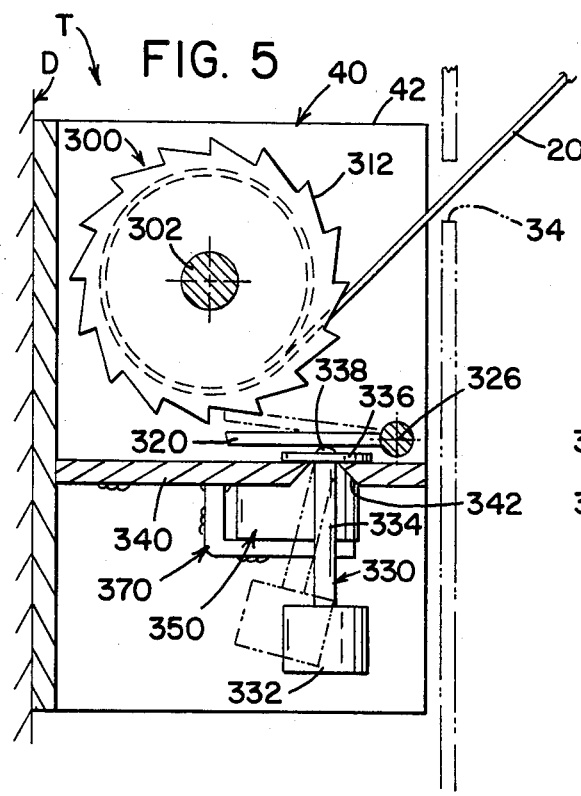
FIG. 5 is a cross-sectional view taken generally along line 5—5 of FIG. 4.
Figure 6:
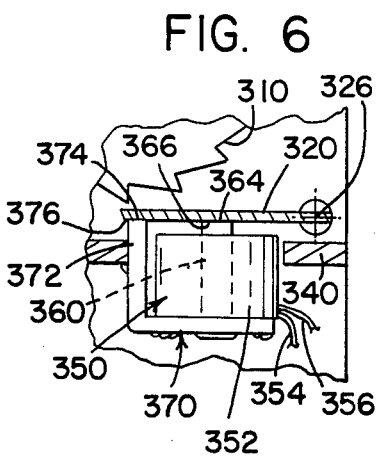
FIG. 6 is a partial cross-sectional view taken generally along line 6—6 of FIG. 4.

In housing 30 there is also provided a second retractor mechanism T for lap belt 20. This second mechanism employs the invention in a retractor of the type having a pendulum as the inertia sensing element or member. Referring now to FIGS. 4, 5 and 6, mechanism T is mounted on the same support frame 40 having generally parallel walls 42, 44. Of course, the second mechanism could be mounted on its own support frame secured to door D. In this embodiment, reel 300 has a central shaft 302 which rotatably mounts the reel between walls 42, 44. Spring 304 exerts a torsional biasing force between tab 306 of housing 40 and shaft 302. Spaced ratchet plates 310, 312 are secured on opposite axial ends of reel 300 and are adapted to receive locking bar 320 having outward pivot sections 322, 324 to allow oscillation of bar 320 about axis 326, which axis is parallel to the axis of rotation of shaft 302. Pendulum 330 has a downwardly hanging weight 332 and an upstanding arm 334 connecting weight 332 with a head 336. Boss 338 engages the underside of locking bar 320, as best shown in FIGS. 4 and 5, at a preselected position between axis 326 and the small axis shaft 302. Pendulum 330 is supported by plate 340 and extends through a conical aperture 342 in accordance with somewhat standard practice. After arm 334 has been placed through aperture 342, head 336 is secured thereon by boss 338. Lap retractor mechanism T operates generally in the same fashion as previously described retractor R. Inertia forces detected by pendulum 330 pivots the pendulum into the phantom line position shown in FIG. 5. This causes head 336 to lift or tilt locking bar 320 into the phantom line position of FIG. 5. This locks reel 300 and prevents paying out of belts 20. In accordance with the invention, electromagnet 350 having a core 352 and operating leads 354, 356 is adapted to magnetically attract locking bar 320 formed from a high permeability material. Of course, the locking bar could include a clip or attachment of high permeability material which would overlie the pole piece 362 of core 360 at the upwardly directed flat pole surface 364. The lower flat surface of locking bar 320 or of an attachment to the locking bar defines a keeper surface 366. This keeper surface is coplanar and engages flat surface 364, as illustrated in FIG. 6. The spacing of these coplanar surfaces from axis 326 is such to apply the desired increased load on upward movement or pivoting of bar 320 by pendulum 330 when magnet 350 is engergized by the circuit illustrated in FIG. 9. As the doors open, coplanar surfaces 364, 366 hold locking bar or plate 320 in the unlocked position by a sufficient force to increase the inertia force necessary to shift the locking bar into its phantom line position shown in FIG. 5. This increased force is sufficient to allow normal movement of the door without rendering the pendulum action inoperative in the case of a collision with the door open or with switch 36 inadvertently closed.

Figure 6A:
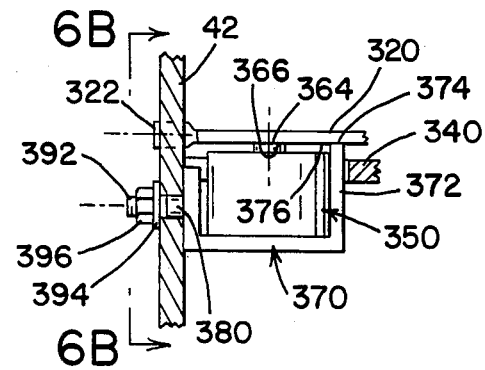
FIG. 6A is a partial cross-sectional view of a modification of the structure shown in FIG. 6 for adjusting the electromagnet with respect to the pivoted locking bar of the retractor mechanism.
Figure 6B:
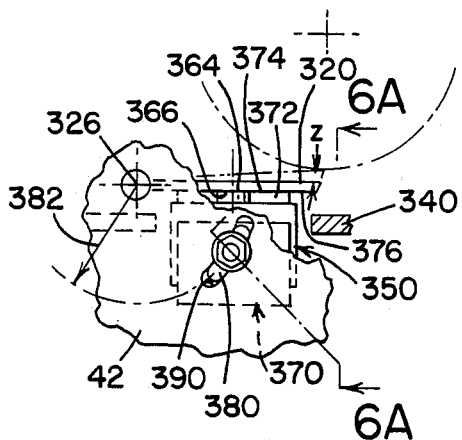
FIG. 6B is a side view taken generally along line 6B—6B of FIG. 6A.
Figure 6C:
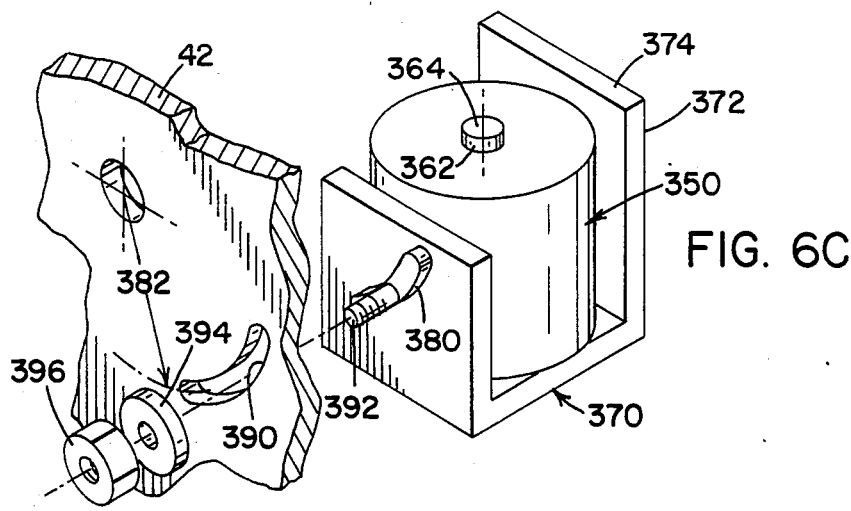
FIG. 6C is an exploded pictorial view of a modification of the invention shown in FIGS. 6A and 6B.

As shown in FIG. 6, magnet 350 is fixedly secured with respect to frame 40. Bracket 370 for magnet 350 is attached to plate 340 so that extension 372 with flat edge surface 374 engages the lower flat surface 376 of locking bar 320 to complete a low reluctance path through ferrous frame 40 and ferrous bracket 370. In this manner there is no appreciative air gap in the completed magnetic circuit. In accordance with another aspect of the invention, frame or support 370 is adjustable on frame 40 and with respect to the pivot axis 326 of locking bar 320. This aspect of the invention is shown in FIG. 6A, 6B, and 6C. Bracket 370 is not fixedly secured to wall 42 or a sub-wall thereof until actual assembly occurs. An arcuate protrusion 380 has a curvature 382 centered at pivotal axis 326 of locking bar 320, as best shown in FIG. 6B. A matching arcuate slot 390 in wall 42 or a sub-wall secured to frame 40 receives protrusion 380 and allows movement of bracket 370 about axis 326. Bolt 392 is adapted to receive lock washer 394 and nut 396. During shipment and assembly, nut 396 is not tightened to lock bracket 370 in a final arcuate position. Consequently, magnet 350 and bar 320 having keeper surface 366 can be pivoted with respect to axis 326. In assembly, the angular position of locking plate 320 can vary as illustrated by the angle z shown in FIG. 6B. Upon establishing the actual assembled unlocked position of bar 320, magnet 350 is pivoted with surfaces 364, 366 and surfaces 374, 376 engaging each other in coplanar relationship. Then bracket 370 is locked in position for operation. In this manner, the reluctance R shown in FIG. 8 is fixed and known irrespective of the vicissitudes of assembling process and tolerance variations.

The attraction force between two surfaces is dependent upon the square of the gap between these two surfaces; therefore, by having the surfaces engaging and coplanar, the force is accurately controlled. With a spacing used, the force would be dependent upon manufacturing tolerances. To cause the added force on the sensor members, the magnetic force must have a selected magnitude which may be at a minimum with the pole surface and keeper surface engaging each other. By using the invention less current is required and accurate control is maintained.

When using a pendulum, the keeper surface is away from the pendulum to prevent actual force on the pendulum by a magnet pole surface which would not only change the inertia force to swing the pendulum, but would also obstruct this swinging action.

In practice the doorjamb switch is not used to actuate the electromagnet. This is done by a switch on the door latch itself so that when the door is released for spring induced rapid initial movement, the magnet is energized. Any appropriate switching arrangement can be used with the present invention to indicate that the door is not closed.

Having thus defined the invention, it is claimed:

1. In a seat belt retractor mechanism having a seat belt reel rotatably mounted in a support frame adapted to be assembled on a movable door of a vehicle, said mechanism including a reel having at least at one of its ends a generally circular ratchet plate, a locking element mounted on said support frame and movable between a first rest position allowing said reel to rotate and a second lock position engaging said ratchet plate to hold said reel against rotation in a seat belt protraction direction, an inertia sensor element carried by said support frame and having a normal rest position and forceable into an activated position in response to acceleration of said support frame whereat contact occurs within said locking member, an electromagnet having a coil and mounted on said support frame and having a deenergized first condition without current flowing through said coil and an energized second condition with current flowing through said coil, means for preventing movement of said inertia sensor element into said activated position only when said electromagnet is in said energized second condition and only until forces acting on said inertia element exceed a selected magnitude above the inertia forces resulting from normal movement of said vehicle door, and means for moving said locking element into said lock position when said inertia element is forced into said activated position, means for providing a source of current for energizing said electromagnet, and switch means responsive to said door being open for connecting said current source with said electromagnet coil, the improvement comprising: said electromagnet having a fixed central core with an exposed, generally flat pole surface, said movement preventing means including a generally flat keeper surface associated with said inertia sensor element formed from a magnetically permeable material and engaging said pole surface in a co-planar relationship when said inertia sensor element is in said normal, rest position and magnetically attracted to said pole surface only while said electromagnet is in said energized second condition, and said means for providing a current source insuring a current having a field strength at least equal to a value which maintains said core in a saturated condition when said door switch means is activated whereby a constant magnetic force is exerted on said keeper surface.

2. The improvement as defined in claim 1 wherein said flat pole surface comprises a non-magnetic plating of predetermined thickness and is generally horizontal, said inertia sensor element is a standing man having a lower pedestal with a base having a lower generally flat bottom surface forming said keeper surface and an upper weighted head causing the center of gravity of said standing man to be spaced substantially above said lower bottom surface with said standing man base being formed from a high magnetically permeable material, said keeper surface setting on said flat pole surface when said standing man is in said normal rest position and angled away from said pole surface in said activated position when said standing man tips as a result of vehicle motion.

3. The improvement as defined in claim 2 wherein said keeper surface is circular and has a first area, said pole surface having a second area and said first area being substantially less than said second area.

4. The improvement as defined in claim 3 wherein said current source includes a D.C. voltage supply with an output that can vary in operation and wherein said switch means connects said voltage supply across said electromagnet when said door is opened and means for maintaining a constant current through said electromagnet coil as said output varies.

5. The improvement as defined in claim 4 including means for maintaining said standing man centered on said flat pole surface.

6. The improvement as defined in claim 5 wherein said pole surface includes a thin plated layer of metal having a given thickness.

7. The improvement as defined in claim 6 wherein said thickness is less than about 0.001 inches.

8. The improvement as defined in claim 1 wherein said keeper surface is circular and has a first area, said pole surface having a second area and said first area being substantially less than said second area.

9. The improvement as defined in claim 1 wherein said current source includes a D.C. voltage supply with an output that can vary in operation and wherein said switch means connects said voltage supply across said electromagnet when said door is opened and means for maintaining a constant current through said electromagnet coil as said output varies.

10. The improvement as defined in claim 2 including means for maintaining said standing man centered on said flat pole surface.

11. The improvement as defined in claim 1 wherein said pole surface includes a thin plated layer of metal having a given thickness.

12. The improvement as defined in claim 11 wherein said thickness is less than about 0.001 inches.

13. The improvement as defined in claim 1 wherein said movable locking element includes a portion forming said flat keeper surface and engaging said pole surface when said locking element is in said first rest position and pulled from said core when said locking element is in said second lock position.

14. The improvement as defined in claim 13 wherein said inertia sensor element is spaced laterally from said flat keeper surface.

15. The improvement as defined in claim 14 wherein said inertia element is a hanging pendulum with a lower weighted portion and means for allowing said pendulum to pivot at a location above said weighted portion between a generally vertical position corresponding to said normal rest position and a position angled from said vertical position and corresponding to said activated position.

16. The improvement as defined in claim 15 wherein said movable locking means includes a bar and means for pivoting said bar about a given axis between said first rest position and said second lock position.

17. The improvement as defined in claim 16 wherein said keeper surface is offset from said given axis a given direction.

18. The improvement as defined in claim 17 wherein said vertical position of said pendulum is offset from said axis in said given direction.

19. The improvement as defined in claim 18 including means for adjustably mounting said electromagnet with respect to said support frame whereby said pole surface of said electromagnet and said flat keeper surface can be adjusted to said coplanar relationship.

20. The improvement as defined in claim 1 wherein said inertia element is a hanging pendulum with a lower weighted portion and means for allowing said pendulum to pivot at a location above said weighted portion between a generally vertical position corresponding to said normal rest position and a position angled from said vertical position and corresponding to said activated position.

21. The improvement as defined in claim 20 wherein said movable locking means includes a bar and means for pivoting said bar about a given axis between said first rest position and said second lock position.

22. The improvement as defined in claim 1 wherein said movable locking means includes a bar and means for pivoting said bar about a given axis between first rest position and said second lock position.

23. The improvement as defined in claim 22 wherein said keeper surface is offset from said given axis a given direction.

24. The improvement as defined in claim 23 wherein said vertical position of said pendulum is offset from said axis in said given direction.

25. The improvement as defined in claim 21 including means for adjustably mounting said electromagnet with respect to said support frame whereby said pole surface of said electromagnet and said flat keeper surface can be adjusted to said coplanar relationship.

26. The improvement as defined in claim 22 including means for adjustably mounting said electromagnet with respect to said support frame whereby said pole surface of said electromagnet and said flat keeper surface can be adjusted to said coplanar relationship.

27. The improvement as defined in claim 23 including means for adjustably mounting said electromagnet with respect to said support frame whereby said pole surface of said electromagnet and said flat keeper surface can be adjusted to said coplanar relationship.

28. The improvement as defined in claim 15 including means for adjustably mounting said electromagnet with respect to said support frame whereby said pole surface of said electromagnet and said flat keeper surface can be adjusted to said coplanar relationship.

29. The improvement as defined in claim 13 including means for adjustably mounting said electromagnet with respect to said support frame whereby said pole surface of said electromagnet and said flat keeper surface can be adjusted to said coplanar relationship.

30. The improvement as defined in claim 20 including means for adjustably mounting said electromagnet with respect to said support frame whereby said pole surface of said electromagnet and said flat keeper surface can be adjusted to said coplanar relationship.

31. A device for locking the payout of a seat belt from a seat belt retractor mechanism in response to a sudden acceleration or deceleration of a vehicle on which said device is mounted, said device comprising an electromagnet with an operating coil and a fixed core with a pole piece having a flat metal plated surface of predetermined thickness, an element with a flat keeper surface formed from magnetically permeable material, an inertia sensing member moved by external forces exerted on said vehicle, means for allowing relative movement between said pole pieces and element from a first position with said pole piece and keeper surface engaging each other in a coplanar relationship into a second position with said keeper surface pulled away from said engaging coplanar relationship when said inertia sensing member is moved, means for mechanically locking said retractor by movement of said inertia sensing member when said pole piece and element are in said second position; and means for selectively causing said electromagnet to exert a substantially constant attraction force between said pole piece and keeper surface tending to resist initial movement of said inertia sensing member.

32. In a seat belt retractor mechanism having a seat belt reel rotatably mounted in a support frame adapted to be assembled on a movable door of a vehicle, said mechanism including a reel having at least at one of its ends a generally circular ratchet plate, a locking element mounted on said support frame and movable between a first rest position allowing said reel to rotate and a second lock position engaging said ratchet plate to hold said reel against rotation in a seat belt protraction direction, an inertia sensor element carried by said support frame and having a normal rest position and forceable into an activated position in response to rapid movement of said support frame whereat contact occurs with said locking member, an electromagnet having a coil mounted on said support frame and having a deenergized first condition and an energized second condition, means for preventing movement of said inertia sensor element into said actuated position only when said electromagnet is in said energized second condition and only until forces acting on said inertia element exceed a selected magnitude above the inertia forces resulting from normal movement of said vehicle door, and means for moving said locking element into said lock position when said inertia element is forced into said activated position, means for providing a source of current for energizing said electromagnet, and switch means responsive to said door being open for connecting said current source with said electromagnet, the improvement comprising: said electromagnet having a fixed central core with an exposed, generally flat pole surface plated with non-magnetic material of predetermined thickness, said movement preventing means including a generally flat keeper surface formed from a magnetically permeable material engaging said pole surface in a co-planar relationship when said inertia sensor element is in said normal rest position and magnetically attracted to said pole surface only while said electromagnet is in said energized second condition and means for maintaining a substantially constant attractive force between said keeper surface and said pole piece when current is applied to said electromagnet.

33. The improvement as defined in claim 32 including means for adjustably mounting said electromagnet with respect to said support frame whereby said pole surface of said electromagnet and said flat keeper surface can be adjusted to said coplanar relationship.

34. The improvement as defined in claim 32 wherein said second flat pole surface is generally horizontal and said inertia sensor element is a standing man having a lower pedestal with a base having a lower generally flat bottom surface forming said keeper surface and an upper weighted head causing the center of gravity of said standing man to be spaced substantially above said lower bottom surface with said standing man base being formed from a high magnetically permeable material and said keeper surface setting on said flat pole surface when said standing man is in said normal rest position whereby said activated position is when said standing man tips on said pole surface.

35. The improvement as defined in cliam 32 wherein said current source includes a D.C. voltage supply with an output that can vary in operation and wherein said switch means connects said voltage supply across said electromagnet when said door is opened and means for maintaining a constant current through said electromagnet coil as said output varies.

36. The improvement as defined in claim 32 wherein said movable locking element includes a portion forming said flat keeper surface and engaging said pole surface when said locking element is in said first rest position and pulled from said core when said locking element is in said second lock position.

37. The improvement as defined in claim 32 wherein said inertia element is a hanging pendulum with a lower weighted portion and means for allowing said pendulum to pivot at a location above said weighted portion between a generally vertical position corresponding to said normal rest position and a postion angled from said vertical position and corresponding to said activated position.

38. The improvement as defined in claim 32 wherein said movable locking means includes a bar and means for pivoting said bar about a give axis between said first rest position and said second lock position.

39. The improvement as defined in claim 32 wherein said reel has a rotational axis and two ends and includes a circular ratchet plate at each end thereof and said locking element is an elongated locking bar pivotally mounted on said support frame about an axis parallel to said rotational axis and adapted to engage both of said ratchet plates when in said second lock position.

* * * * *